(12) United States Patent
Baggs

(10) Patent No.: US 7,031,548 B2
(45) Date of Patent: Apr. 18, 2006

(54) METHOD AND APPARATUS FOR FILTERING NOISE FROM A DIGITAL IMAGE

(75) Inventor: Scott Clinton Baggs, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 747 days.

(21) Appl. No.: 09/971,719

(22) Filed: Oct. 4, 2001

(65) Prior Publication Data

US 2003/0068093 A1   Apr. 10, 2003

(51) Int. Cl.
*G06K 9/40* (2006.01)

(52) U.S. Cl. ............... 382/261; 382/162; 382/199; 382/261; 382/275

(58) Field of Classification Search ........ 382/260–275, 382/279, 199, 162
See application file for complete search history.

(56) References Cited

U.S. PATENT DOCUMENTS

| 5,317,420 | A  | * | 5/1994  | Kuwahara ............ 358/463 |
| 6,233,364 | B1 |   | 5/2001  | Krainiouk et al. |
| 6,621,937 | B1 | * | 9/2003  | Adams et al. ........ 382/275 |
| 6,631,162 | B1 | * | 10/2003 | Lee et al. ........... 375/240.16 |
| 6,636,645 | B1 | * | 10/2003 | Yu et al. ............ 382/268 |
| 6,667,815 | B1 | * | 12/2003 | Nagao ................ 358/1.9 |
| 6,721,458 | B1 | * | 4/2004  | Ancin ................ 382/261 |
| 6,784,944 | B1 | * | 8/2004  | Zhang et al. ........ 348/607 |
| 6,804,392 | B1 | * | 10/2004 | Adams et al. ........ 382/167 |
| 6,819,804 | B1 | * | 11/2004 | Tenze et al. ........ 382/262 |

FOREIGN PATENT DOCUMENTS

| GB | 2322252 A | 8/1998 |
| GB | 2323994 A | 10/1998 |

OTHER PUBLICATIONS

Jae S. Lim, Two-Dimensional Signal and Image Processing, 1990, p. 476.

* cited by examiner

*Primary Examiner*—Kanjibhai Patel

(57) ABSTRACT

As is known in the art, it becomes progressively difficult to identify an image region as being caused by noise as the area of that image region increases. The present invention encompasses the discovery that image data associated with smaller noise regions tends to mirror image data associated with larger noise regions. In accordance with the present invention, known techniques are used to accurately identify smaller noise regions. The image data extracted from these smaller noise regions is then used to aid in the identification of larger noise regions. Accordingly, the present invention increases the area of noise regions capable of being accurately identified compared to prior art noise identification techniques. Once large and small noise regions have been identified, the noise regions can be filtered using techniques known in the art.

22 Claims, 12 Drawing Sheets

METHOD AND APPARATUS FOR FILTERING NOISE FROM A DIGITAL IMAGE

FIELD OF THE INVENTION

This invention relates generally to digital images, and more specifically, to a method and apparatus for filtering noise from a digital image.

BACKGROUND

Digital image capture devices are well known in the art and may be used to capture digital images of objects. One of the more common digital image capture device is the digital camera, which allows its user to take digital photographs that may ultimately be transferred or downloaded to a computer for viewing and/or editing.

Scanner devices are also a common type of digital image capture device. Although scanner devices may be used in various ways, scanner devices are often used to convert traditional photographs into digital format. For example, a color optical scanner device, such as a flatbed scanner, may be used to produce machine-readable color image data signals that are representative of a traditional photograph. In a typical scanner application, the color image data signals produced by the scanner may be used by a computer to reproduce a digital image of the scanned object on a suitable display device, such as a cathode ray tube ("CRT") or liquid crystal display ("LCD"). Alternatively, the computer may print the image of the scanned object on a printer. Indeed, by using a scanner and a high quality color printer, the need for traditional film processing may be eliminated entirely.

Scanners, digital cameras, and the computers to which they may be linked continue to decrease in price while increasing in quality. Moreover, with the continually developing technologies, the process of capturing, viewing and editing digital images is even becoming easier. As a result, more people find themselves using computers, scanners, and/or digital cameras to capture, view, edit and share (e.g., email over the Internet) digital images.

Although digital image capture devices are relatively easy to use, many digital images produced by such devices nevertheless contain areas or regions of noise that can diminish the visual quality of the digital image. For example, the digital image may contain a pixel having a color that is not consistent with the color of adjacent or surrounding pixels. Such irregularly colored pixels may commonly be referred to as noise speckles, impulsive noise, and/or salt-and-pepper noise. The digital image may also contain larger noise areas or regions (e.g., larger than one pixel). That is, the digital image may contain a group of adjacent pixels having a color or colors that are inconsistent with the color(s) of adjacent or surrounding pixels. Such irregularly colored groups of adjacent pixels may be commonly referred to as noise splotches or blotches.

The cause or source of noise speckles and/or noise splotches in a digital image may vary. For example, noise speckles and splotches may be especially problematic when relatively old traditional photographs are converted to digital format with such noise being caused by the photograph's condition and/or the equipment being used to convert the photograph to digital format. By way of example, the original photograph may have stains, faded areas, wrinkles, etc. which appear as noise in the resulting digital image. Or for example, dust may have been present on the scanning bed when the photograph was scanned. In any event, noise arising from the same source (e.g., dust on the scanning bed, wrinkles in the source object, etc.) should have the same image data (e.g., color profile) associated with it.

Typically, digital images, after being captured, are downloaded to a computer system so that they may be edited with readily available software applications such as Adobe Photoshop®, available from Adobe Systems Incorporated, San Jose, Calif. Such software applications provide a wide range of editing features such as "red-eye" reduction and poor lighting correction. Some software applications also allow for the filtering of noise speckles. However, such software applications do not usually provide an automated filtering process for the larger areas of noise splotches due to the difficulties associated with distinguishing noise splotches from details in the digital image being filtered.

SUMMARY OF THE INVENTION

As is known in the art, it becomes progressively difficult to identify an image region as being caused by noise as the area of that image region increases. The present invention encompasses the discovery that image data, such as color values and/or gray scale values, associated with smaller noise regions, such as speckles, tends to mirror image data associated with larger noise regions, such as splotches. In accordance with the present invention, known techniques are used to accurately identify smaller noise regions. The image data extracted from these smaller noise regions is then used to aid in the identification of larger noise regions. Accordingly, the present invention increases the area of noise regions capable of being accurately identified compared to prior art noise identification techniques. Once large and small noise regions have been identified, the noise regions can be filtered using known techniques known in the art.

According to one embodiment of the present invention, a method is disclosed that comprises the steps of: obtaining image data for a first type of noise region in a digital image; using the image data for the first type of noise region to locate a second type of noise region in the digital image; and filtering the second type of noise region.

Also disclosed is an apparatus that may comprise one or more computer readable storage media and computer readable program code stored thereon. The computer readable program code comprises program code for obtaining image data for a first type of noise region in a digital image, and program code for using the image data for the first type of noise region to locate a second type of noise region in the digital image. The computer readable program code also includes program code for filtering the second type of noise region.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
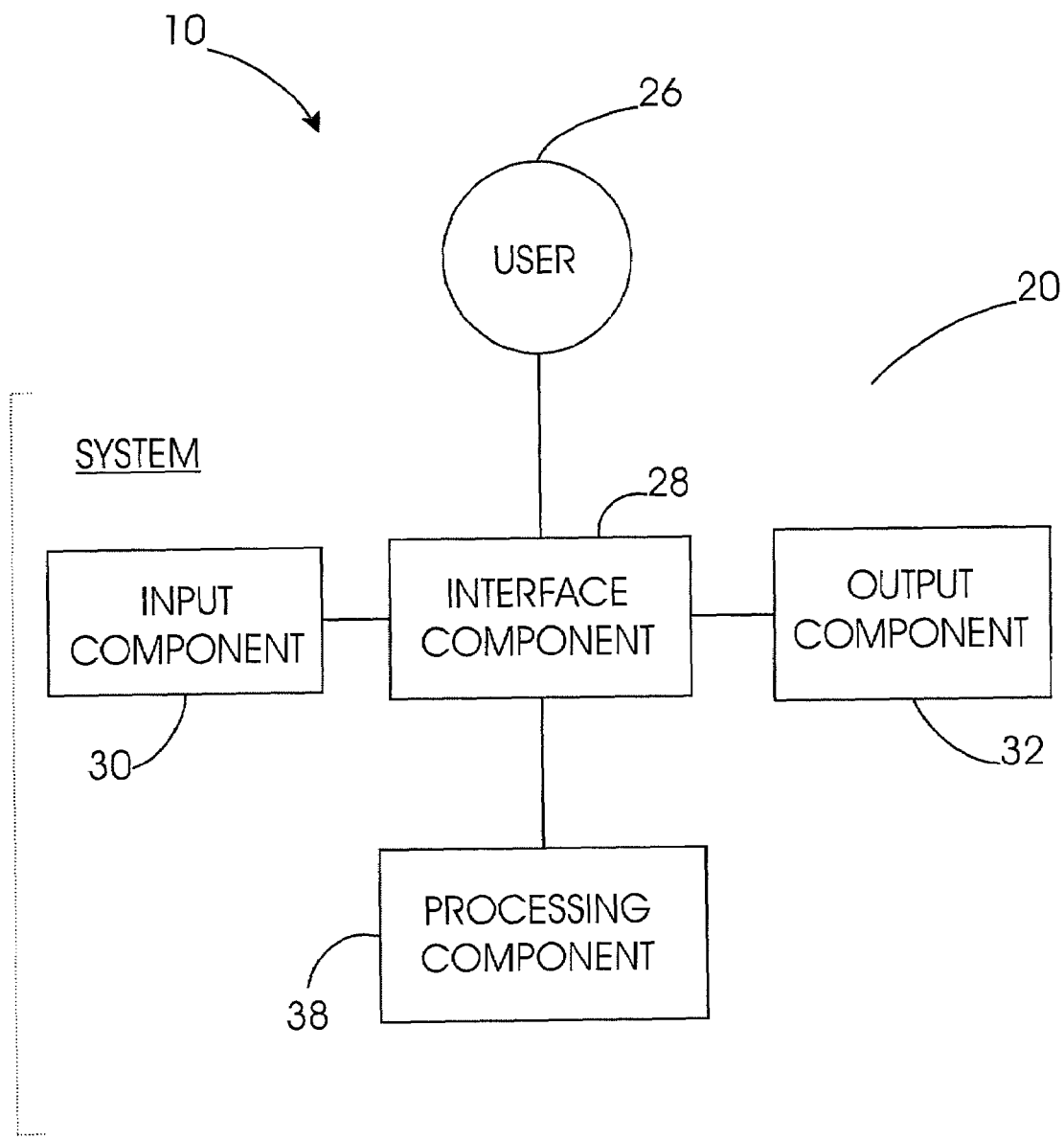
FIG. 1 is a high level diagram illustrating the components of a system embodiment for filtering noise from a digital image according to one embodiment of the present invention.
Figure 2:
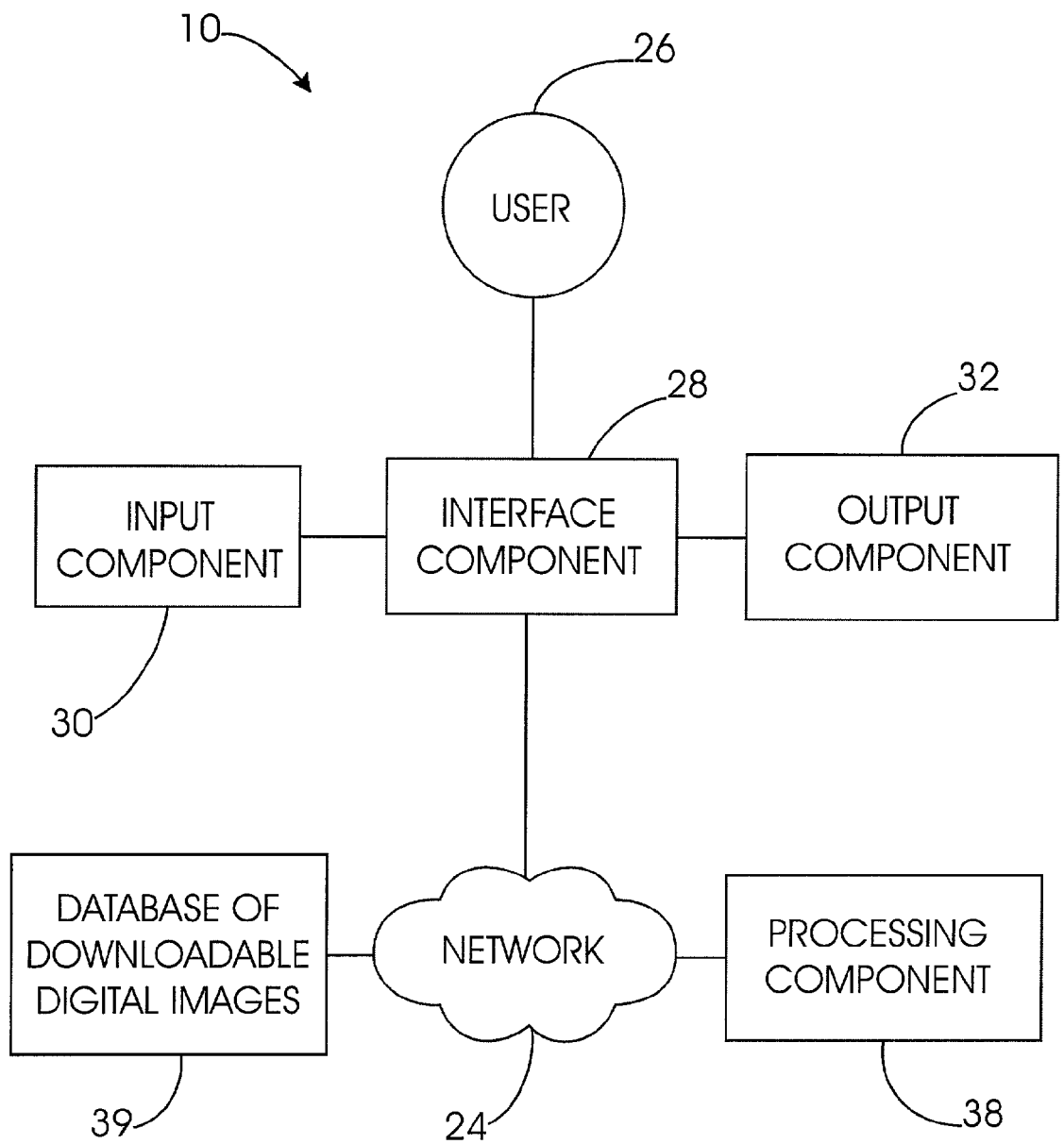
FIG. 2 is a high level diagram illustrating the components of a network embodiment for filtering noise from a digital image according to one embodiment of the present invention.
Figure 3:
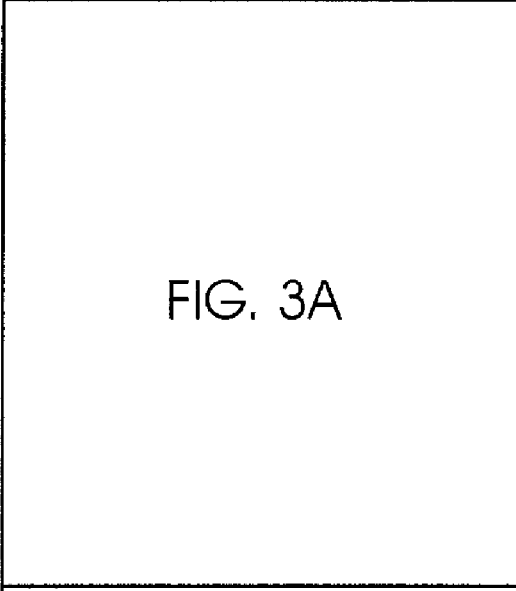
FIG. 3 illustrates the relationship between FIGS. 3A and 3B.
Figure 3:
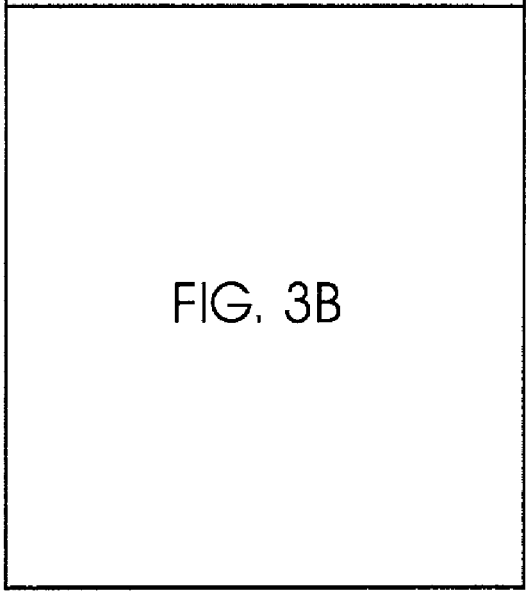
Figure 3A:
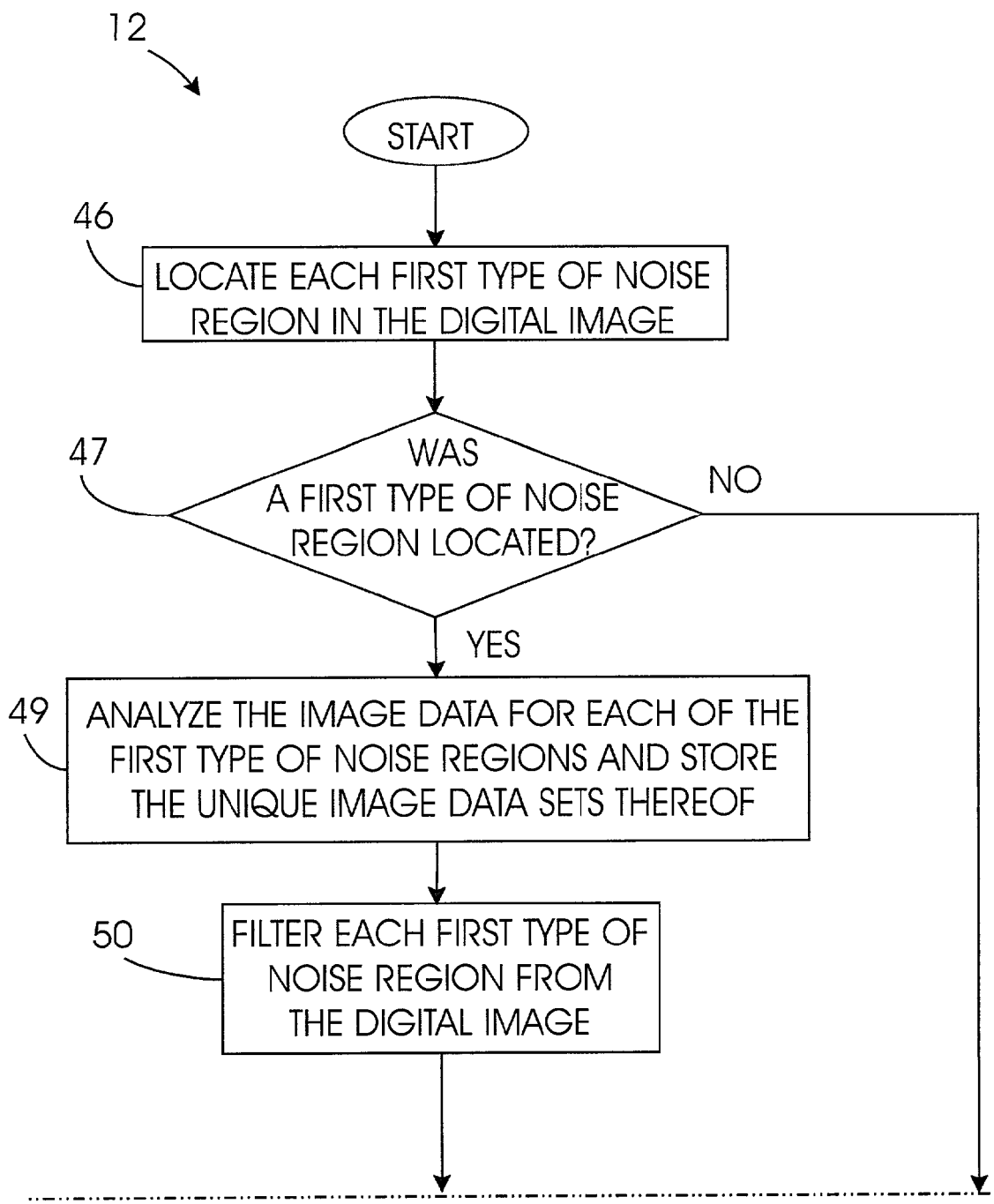
FIGS. 3A and 3B form a flow chart illustrating an embodiment of a method for filtering noise from a digital image.
Figure 3B:
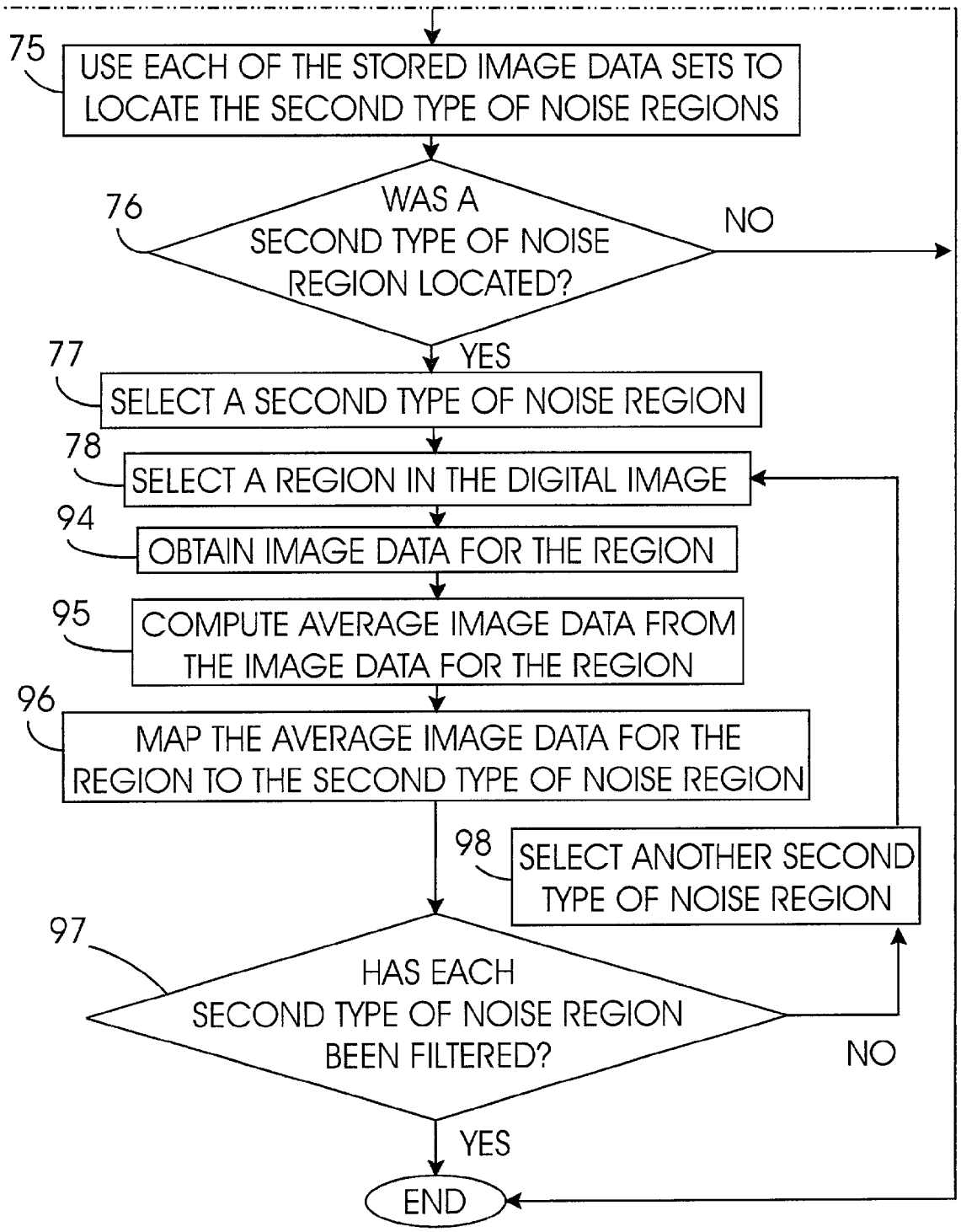

The present invention comprises both an apparatus 10 and a method 12 for filtering (i.e., locating and removing) noise from a digital image 14. The apparatus 10 is shown in FIGS. 1 and 2, whereas the method 12 is illustrated in FIGS. 3A and 3B. Briefly, the invention generally comprises using image data from one or more small areas of noise (e.g., first noise region 15) in a digital image (e.g., digital image 14) to locate one or more larger areas of noise (e.g., second noise region 17) in the digital image and then filtering the larger areas of noise located thereby from the digital image.

More specifically, it is known in the art that it becomes progressively difficult to identify an image region as being caused by noise as the area of that image region increases. The present invention encompasses the discovery that image data, such as color values and/or gray scale values, associated with smaller noise regions (e.g., first noise region 15), tends to mirror image data associated with larger noise regions (e.g., second noise region 17). In accordance with the present invention, known techniques are used to accurately identify smaller noise regions, such as noise speckles. The image data extracted from these smaller noise regions is then used to aid in the identification of larger noise regions, such as noise splotches. Accordingly, the present invention increases the area of noise regions capable of being accurately identified compared to prior art noise identification techniques. Once large and small noise regions have been identified, the noise regions may be filtered using techniques known in the art.

As seen in FIGS. 1 and 2, the apparatus 10 that performs the method 12 may comprise a system 20 (e.g., personal computer system 22, a kiosk, etc.) and/or a network 24 (e.g., the Internet, Intranet, Wide Area Network (WAN), Local Area Network (LAN), etc.). Generally, a user 26 may interact with the system 20 or the network 24 via an interface component 28 (e.g., a graphical user interface (GUI)). The interface component 28 may interface the user 26 with an input component 30 (e.g., digital camera 16, scanner 18, etc.), an output component 32 (e.g., computer monitor 34, printer 36), and a processing component 38 (e.g., computer readable program code). In the network embodiment shown in FIG. 2, the interface component 28 may further allow the user 26 to access a database of downloadable images 39 over the network 24 and thus download digital images therefrom.

Figure 4:
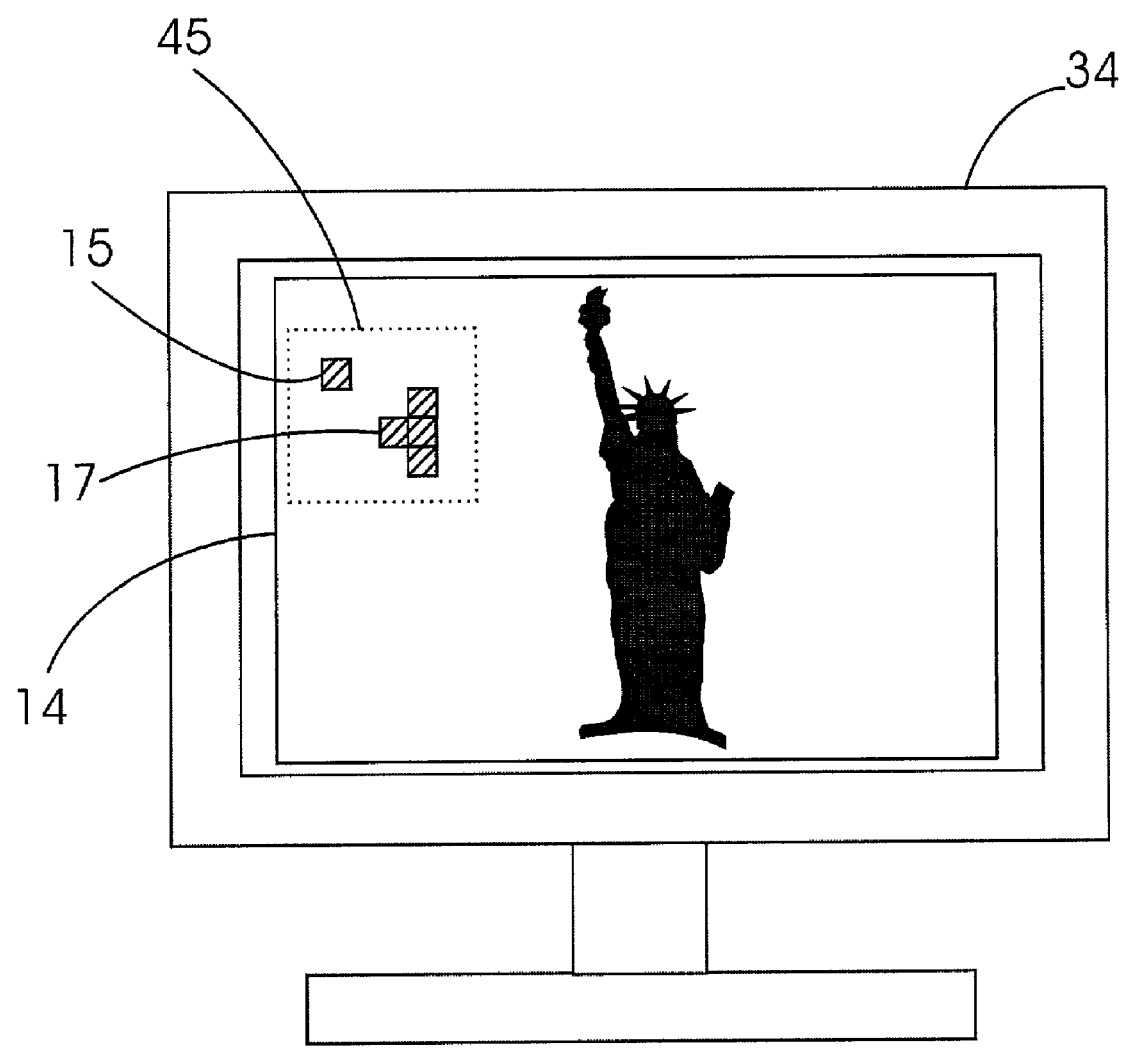
FIG. 4 is a plan view of a digital image displayed on a computer display screen.
Figure 5:
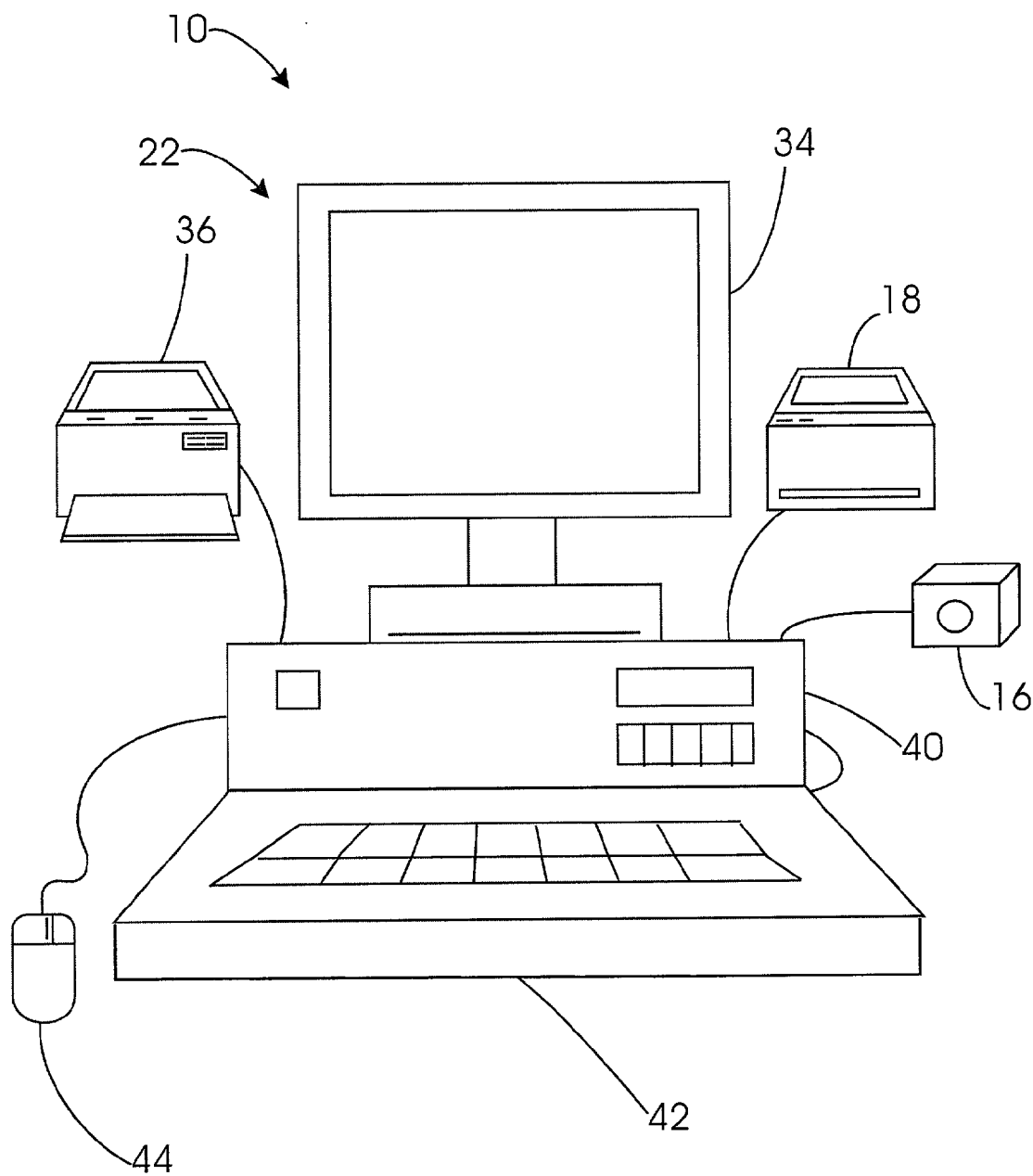
FIG. 5 is a pictorial representation of a computer system in which the method illustrated in FIGS. 3A and 3B may be used according to one embodiment of the present invention.

Referring now to FIG. 5, in one embodiment, the apparatus 10 may comprise the computer system 22 that includes the digital camera 16, the scanner 18, the computer monitor 34, the printer 36, a processing unit 40, a keyboard 42, and a mouse 44. As shown in FIG. 4, the apparatus 10 may be provided with image processing software that allows the apparatus 10 to display on the computer monitor 34 the digital image 14, including a portion or section 45 thereof that contains the first and second noise regions 15 and 17. The apparatus 10 may also print the digital image 14 on the printer 36 (FIG. 5).

The invention may be embodied in computer readable program code stored on one or more computer readable storage media. The one or more computer readable storage media may be contained within one or more computer readable storage devices operatively associated with the computer system 22. Alternatively, the computer readable program code may be stored at a remote site (item 38 in FIG. 2) and may be accessible over the network 24. Regardless of where it is stored, the computer readable program code may comprise program code for carrying out one or more of the various steps of the method 12 shown in FIGS. 3A and 3B.

As shown in FIGS. 3A and 3B, the method 12 generally comprises the following steps. In the first step 46 (FIG. 3A) of method 12, the digital image 14 is analyzed to locate the noise speckles or first type of noise regions (e.g., first noise region 15, FIG. 4) contained in the digital image 14. In one embodiment, out-range pixel smoothing may be used to locate the noise speckles or first type of noise regions in the digital image 14. In another embodiment (FIG. 7), the noise speckles or first type of noise regions may be located by using an edge detect filter (not shown) in accordance with the process 46. For more information on out-range pixel smoothing and edge detect filters, please see *Two-Dimensional Signal And Image Processing* by Jae S. Lim. Alternatively, any of a wide range of other methods may be used to locate the noise speckles or first type of noise regions in the digital image 14 as would be obvious to persons have ordinary skill in the art after having become familiar with the teachings of the present invention.

It should be noted the terms "noise speckle" and "first type of noise region" are used interchangeably herein and generally refer to the smaller areas of noise in a digital image. Typically, noise speckles are limited in size to one pixel, although such need not be the case. It should also be noted that the terms "noise splotch" and "second type of noise region" are also used interchangeably herein and generally refer to the larger areas of noise in a digital image. Typically, noise splotches, which may also be known as noise blotches, are larger than one pixel, although such need not be the case. It should also be noted that although the digital image 14 is shown and described herein as having only a single noise speckle or first type of noise region (i.e., first noise region 15) and a single noise splotch or second type of noise region (i.e., second noise region 17), the apparatus 10 and method 12 may be used to filter noise from digital images containing a plurality of noise speckles, each or some of which may have unique or different image data (e.g., varying colors and shades) associated therewith, and/or containing a plurality of noise splotches, each or some of which may have unique or different image data (e.g., varying colors and shades) associated therewith.

Referring back to FIG. 3A, in the next step 47 of method 12, a determination may be made as to whether a noise speckle or first type of noise region (e.g., first noise region 15) was located at step 46 in the digital image 14. If it is determined at step 47 that no noise speckles were located in the digital image 14, the method 12 concludes. However, if it is determined at step 47 that one or more noise speckles were located at step 46, then the image data for each noise speckle may be analyzed at step 49, and the unique image data sets thereof may be stored also at step 49. For example, in the embodiment shown and described herein, the image data for the first noise region 15 will be stored at step 49.

Now that the image data for the first noise region 15 has been stored, the first noise region 15 may be filtered from the digital image 14 at step 50, for example, by using out-range pixel smoothing. Alternatively, other methods for filtering noise speckles, also known as salt-and-pepper noise, from digital images may be used at step 50 to filter the first noise region 15 from the digital image 14 as would be obvious to persons having ordinary skill in the art after having become familiar with the teachings of the present invention.

Referring now to FIG. 3B, regardless of how the first noise region 15 was located in (step 46) and then filtered from (step 50) the digital image 14, the image data set for the first noise region 15 that was stored at step 49 may be used at step 75 to locate the second type of noise regions or noise splotches contained in the digital image 14. In one embodiment, the splotch-locating step 75 may generally comprise the steps illustrated in FIG. 11, each of which will be explained in greater detail below.

At step 76, a determination may be made as to whether a second type of noise region or noise splotch was located at step 75. If it is determined at step 76 that one or more noise splotches were located at step 75, then one of those noise splotches may be selected at step 77. In the embodiment shown and described herein, the digital image 14 has only a single noise splotch (i.e., second noise region 17) thus the second noise region 17 is selected at step 77.

Figure 6:
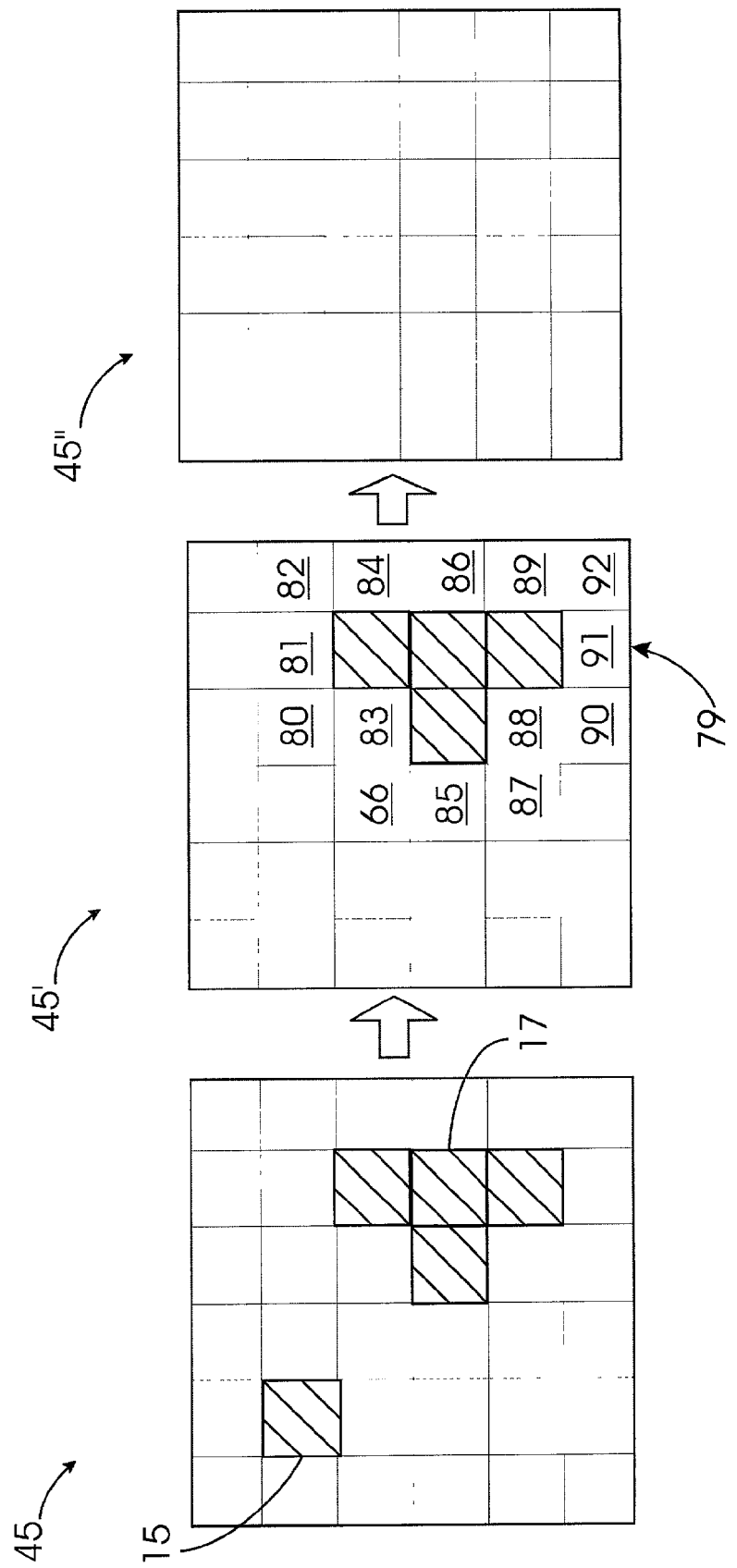
FIG. 6 is a process flow diagram illustrating the various stages of the pixels within a portion of the digital image shown in FIG. 4 while undergoing the method illustrated in FIGS. 3A and 3B.

After being selected, the second noise region 17 may be filtered from (i.e., removed from or smoothed out of) the digital image 14. To remove or smooth the second noise region 17 from the digital image 14, a region 79 in the digital image 14 may be selected at step 78. The region 79 may comprise at least one pixel (e.g., 66, 80, 81, 82, 83, 84, 85, 86, 87, 88, 89, 90, 91, 92 shown in FIG. 6) adjacent the second noise region 17. In the embodiment shown and described herein, the region 79 comprises the pixels 66, 80, 81, 82, 83, 84, 85, 86, 87, 88, 89, 90, 91, and 92. Alternatively, other pixels and/or other pixel combinations may be used for the region 79 as would be obvious to persons having ordinary skill in the art after having become familiar with the teachings of the present invention.

Figure 8:
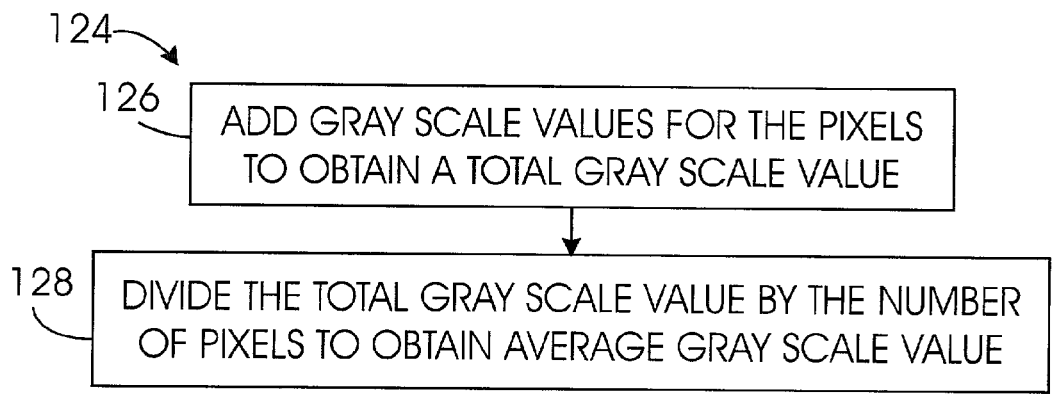
FIG. 8 is a flow chart illustrating an embodiment of the image data averaging step of the method shown in FIGS. 3A and 3B.
Figure 9:
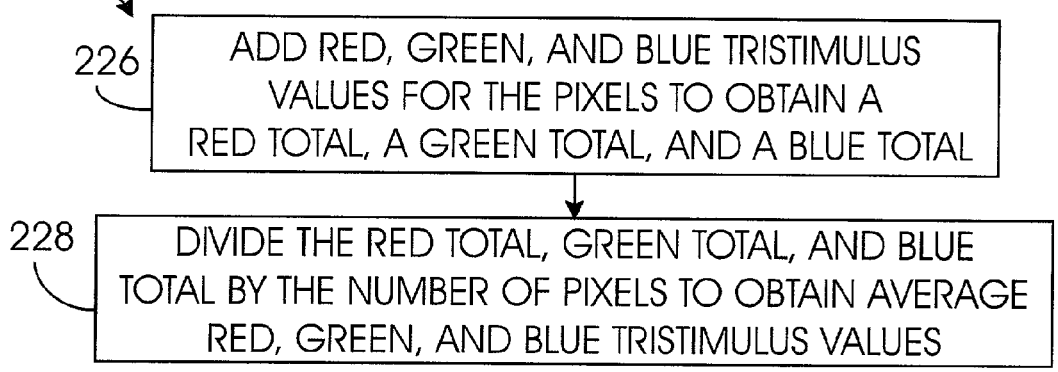
FIG. 9 is another flow chart illustrating another embodiment of the image data averaging step of the method shown in FIGS. 3A and 3B.
Figure 10:
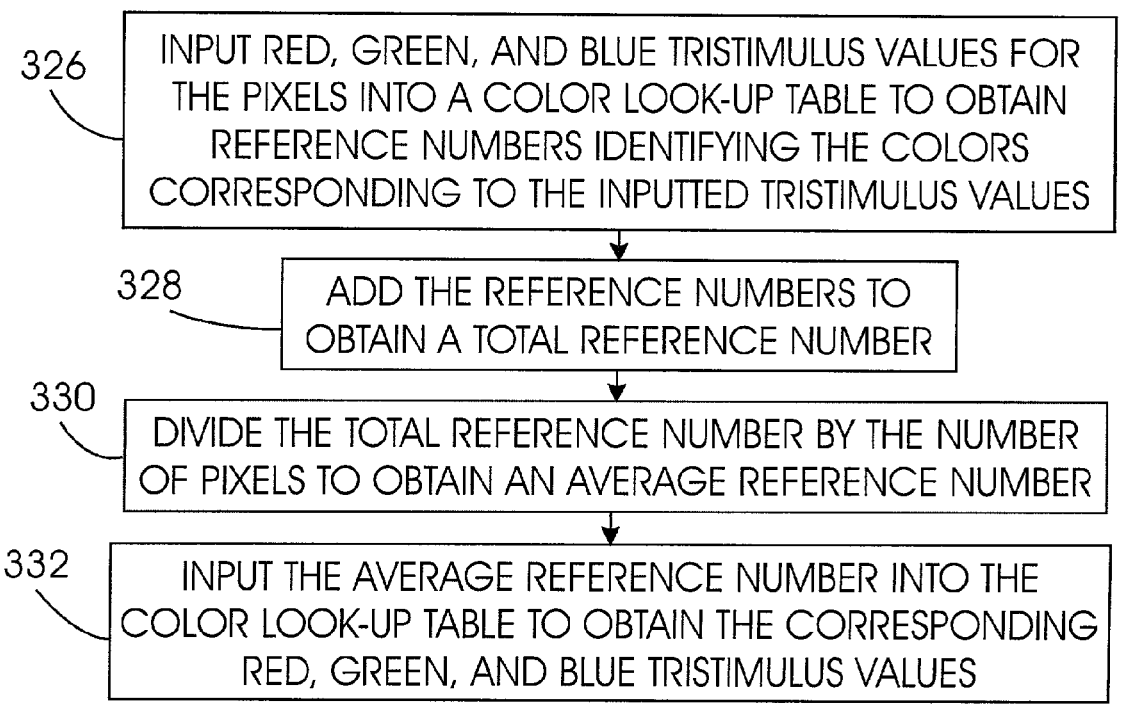
FIG. 10 is yet another flow chart illustrating yet another embodiment of the image data averaging step of the method shown in FIGS. 3A and 3B.

In the next step 94, the image data for the region 79 may be obtained. Since the region 79 may comprise a plurality of pixels, each or some of which may have unique or different image data (e.g., varying colors and shades) associated therewith, the apparatus 10 may perform an averaging process at step 95 to obtain average image data for the region 79. As shown in FIGS. 8, 9, and 10, various embodiments 124, 224, 324 for the image data averaging process may be used by the apparatus 10 at step 95, each of which will be discussed in greater detail below. It should be noted, however, that if the region 79 contained only one pixel, the image data averaging step 95 would not be needed.

After the average image data for the region 79 has been computed, the average image data for the region 79 may be mapped to the second noise region 17 (step 96) so that the second noise region 17 is removed from or smoothed out of the digital image 14. See 45' and 45" in FIG. 6. That is, the image data for the second noise region 17 is replaced with the average image data for the region 79.

In the next step 97, a determination may be made as to whether each noise splotch located at step 75 has been filtered from the digital image 14. If it is determined that that all of the noise splotches have been filtered from the digital image 14, the method 12 concludes. However, if it is determined that all of the noise splotches have not been filtered from the digital image 14, one of the remaining noise splotches may then be selected at step 98. The series of steps 78 through 97 may then be repeated for the newly selected noise splotch. The number of times that the sequence of steps 78 through 97 is repeated will depend on the number of noise splotches located at step 75. In the embodiment shown and described herein, however, the sequence of steps 78 through 97 will not be repeated as the digital image 14 contains only one noise splotch (i.e., second noise region 17).

One advantage that may be realized by one embodiment of the present invention is that it may allow for the filtering of both noise speckles and noise splotches from digital images. Typically, the smaller areas of noise or noise speckles are easily located in a digital image. Such is not the case, however, with the larger areas of noise or noise splotches. More specifically, it is often difficult to locate noise splotches in a digital image due to the difficulties associated with distinguishing noise splotches from the details contained in the digital image. By using the image data (e.g., color profile) from the smaller noise areas to locate the larger noise areas, the present invention may make it easier to locate noise splotches by increasing the probability that the larger noise areas located are, in fact, noise splotches and not details that should remain in the digital image. In doing so, the present invention may allow for more noise to be filtered or removed from digital images than what may be currently possible with existing noise filtering processes.

Another advantage that may be realized by one embodiment of the present invention is that it is easy to use and is compatible with currently available digital image capture devices (e.g., digital camera 16, scanner 18, etc.) and computers (e.g., computer system 22, etc.). Indeed, one embodiment of the present invention is shown and described herein as it may be used in conjunction with the computer system 22 that may comprise any of a wide range of computer systems now known in the art or that may be developed in the future.

Yet another advantage that may be realized is that the various embodiments of the present invention may provide for a fully automated process, a user interactive process, or a combination thereof. For example, one embodiment of the present invention may filter the noise speckles (e.g., first noise region 15) and noise splotches (e.g., second noise region 17) with little to no user interaction. That is, the user 26 may need only to initiate the transfer or download of the digital image 14 to the apparatus 10 to have the first and second noise regions 15 and 17 filtered from the digital image 14 by the apparatus 10. In another embodiment, however, the user 26 may be required to participate substantially in the filtering process. For example, the user 26 may be prompted for each noise splotch (e.g., second noise region 17) to select between filtering and not filtering the respective noise splotch. The user 26 may also be required to enter numerical values for the reference areas and the threshold number(s), as will be explained in greater detail below.

Having briefly described the apparatus 10 and method 12 according to one embodiment of the present invention, as well as some of its more significant features and advantages, the apparatus 10 and method 12 will now be described in detail. However, before proceeding with the description, it should be noted that although the apparatus 10 and method 12 are shown and described herein as they could be used in conjunction with the digital camera 16 and/or the scanner 18, they could also be used in conjunction with any of a wide range of other digital image capture devices. Alternatively, the apparatus 10 and method 12 need not be used in conjunction with a digital image capture device at all. For example, the apparatus 10 and/or method 12 may instead be used to filter digital images downloaded from the database 39 (FIG. 2) over the network 24. Consequently, the present invention should not be regarded as limited to use in conjunction with the digital camera 16 and/or scanner 18 shown and described herein.

With the foregoing considerations in mind, the apparatus 10 and method 12 according to one embodiment of the present invention are both shown and described herein as they could be used in conjunction with the digital camera 16 and/or the scanner 18, both of the type that are readily commercially available and well known in the art. However, since digital cameras and scanners themselves are well known in the art and could readily be provided by persons having ordinary skill in the art after having become familiar with the teachings of the present invention the various component parts of the digital camera 16 and the scanner 18 will not be discussed in further detail herein.

As shown in FIGS. 1 and 2, the apparatus 10 that performs the method 12 may comprise the system 20 and/or the network 24. The system 20 may comprise the computer system 22 shown in FIG. 5. Alternatively, the system 20 may comprise a kiosk (not shown). The network 24 may comprise the Internet, an Intranet, a Wide Area Network (WAN), a Local Area Network (LAN). Generally, the apparatus 10 may be provided with the interface component 28 so that the user 26 may interact with the system 20 and/or the network 24, as the case may be. More specifically, the interface component 28 may interface the user 26 with the input component 30 (e.g., digital camera 16, scanner 18, etc.), the output component 32 (e.g., computer monitor 34, printer 36), and the processing component 38 (e.g., computer readable program code) of the apparatus 10. In the network embodiment shown in FIG. 2, the interface component 28 may further allow the user 26 to access the database of downloadable images 39 over the network 24 and thus download digital images therefrom. In one embodiment, the interface component 28 comprises a graphical user interface (GUI), although such is not required.

As briefly mentioned earlier, the apparatus 10 may comprise the computer system 22 (FIG. 5). The computer system 22 may comprise any of a wide range of computer systems now known in the art or that may be developed in the future. Although computer systems are well known in the art, a brief description of the computer system 22 will be given in order to provide a more complete description of one embodiment of the apparatus 10.

Figure 12:
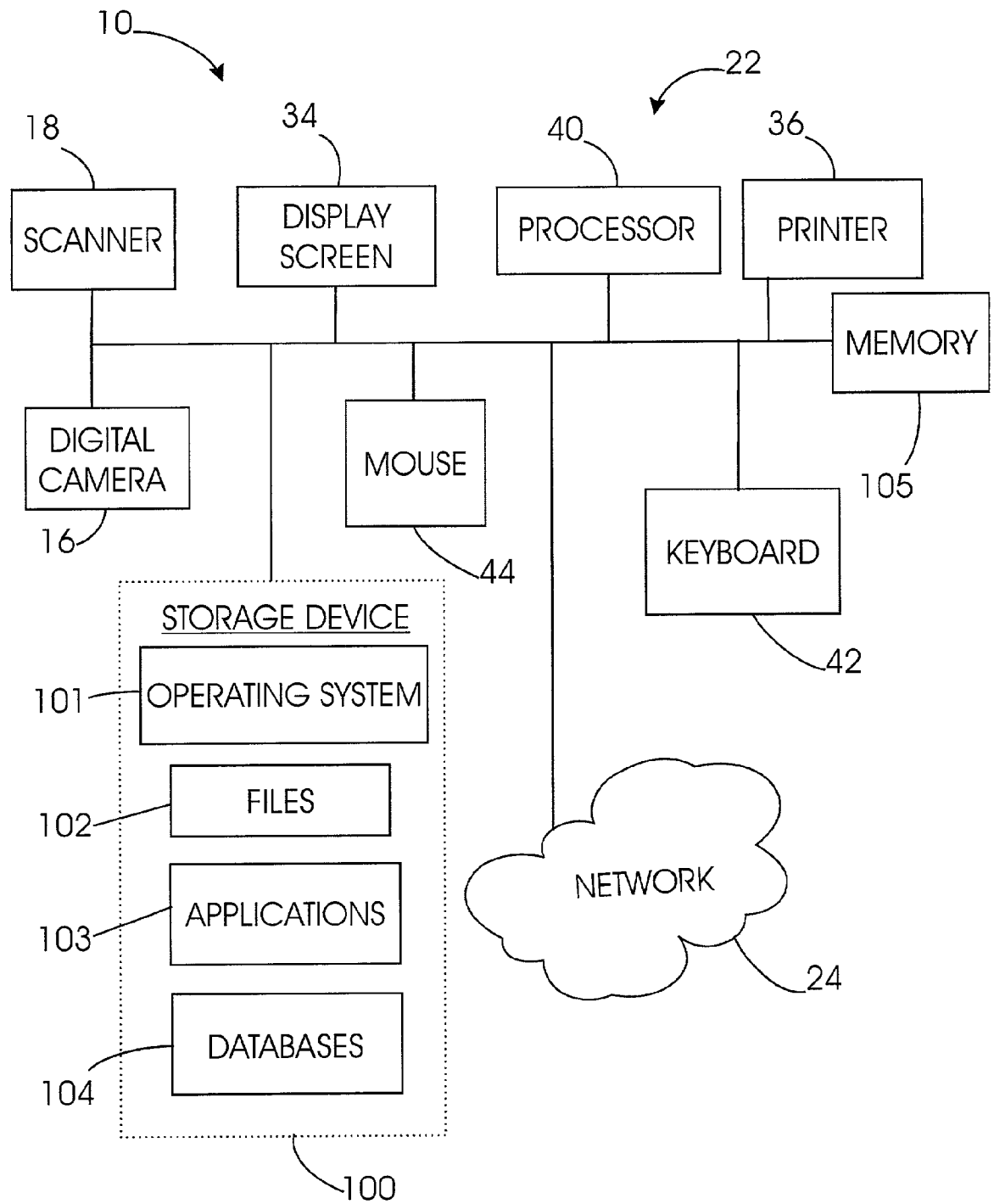
FIG. 12 is a high level diagram illustrating the components of the computer system shown in FIG. 5 that performs one or more of the steps of the method shown in FIGS. 3A and B according to one embodiment of the present invention.

Referring now primarily to FIGS. 5 and 12, the computer system 22 comprising one embodiment of the apparatus 10 may include input devices (e.g., digital camera 16, scanner 18, keyboard 42, mouse 44, etc.), output devices (e.g., computer monitor 34, printer 36, etc.), and a processor or central processing unit (e.g., processing unit 40, etc.). The computer system 22 may further include a storage device 100 having an operating system 101, files 102, applications 103, and databases 104 stored therein. The operating system 101, once installed, may manage the various tasks, jobs, data and devices of the computer system 22. The computer system 22 may further include a memory 105 that the operating system 101 may access in carrying out its functions. Contained on one or more computer readable storage media within one or more computer readable storage devices (e.g., storage device 100, memory 105, etc.) may be computer readable program code for performing or carrying out one or more of the various steps of method 12, which steps were discussed briefly above and are discussed in much greater detail below. The processor 40 may be linked over the network 24 (e.g., a Wide Area Network (WAN), a Local Area Network (LAN), an Intranet, or the Internet, etc.) to a server or pool of servers (not shown).

It is understood that the processing unit 40 may comprise any of a wide range of suitable processors, as would be obvious to persons having ordinary skill in the art after having become familiar with the teachings of the present invention. For example, the processing unit 40 may comprise an Intel PENTIUM® processor, an entire laptop or desktop personal computer (PC), or an application specific integrated circuit (ASIC) specifically manufactured for use with the present invention. Likewise, the storage device 100 and memory 105 can be any suitable computer readable storage device, such as read only memory (ROM), random access memory (RAM), video memory (VRAM), hard disk, floppy diskette, compact disc (CD), magnetic tape, a combination thereof, etc. Further, the processing unit 40 and memory 105 need not be separate units and can be combined, or alternatively, the processing unit 40 and memory 105 can be separately housed and linked to one another over a remote network or other suitable connection. In addition, there can be any number of processing units 40 (i.e., one or more), any number of storage devices 100 (i.e., one or more) and/or any number of memories 105 (i.e., one or more) that are connected or linked via the Internet, Intranet, LAN, WAN, etc. In such a scenario, the storage of computer readable program code may be distributed over the various storage devices 100 and memories 105 and/or executed in parts by the various processors 40. Moreover, any number of suitable peripheral devices (e.g., digital camera 16, scanner 18, monitor 34, printer 36, keyboard 42, mouse 44, etc.) may be connected to the processing unit 40 either directly or indirectly (e.g., over the network 24). The processor 40 can be linked to the network 24 using any suitable connection (e.g., modem, T-1, digital subscriber line (DSL), infrared, etc.).

As discussed briefly above, FIGS. 3A and 3B shows the various steps comprising the method 12 for filtering noise (e.g., first and second noise regions 15 and 17) from digital images. In the first step 46 (FIG. 3A) of method 12, the digital image 14 may be analyzed to locate the noise speckles or first type of noise regions contained in the digital image 14. Any of a wide range of noise speckle locating processes that are well known in the art may be used at step 46 to locate the noise speckles in the digital image 14. Accordingly, the present invention should not be regarded as limited to any particular process for locating noise speckles in a digital image. In one embodiment, out-range pixel smoothing may be used to locate the noise speckles (i.e., first noise region 15) in the digital image 14. In another embodiment, the noise speckles or first type of noise regions may be located by using an edge detect filter (not shown) in accordance with the process 46 illustrated in FIG. 7. For more information on out-range pixel smoothing and edge detect filters, please see *Two-Dimensional Signal And Image Processing* by Jae S. Lim.

Figure 7:
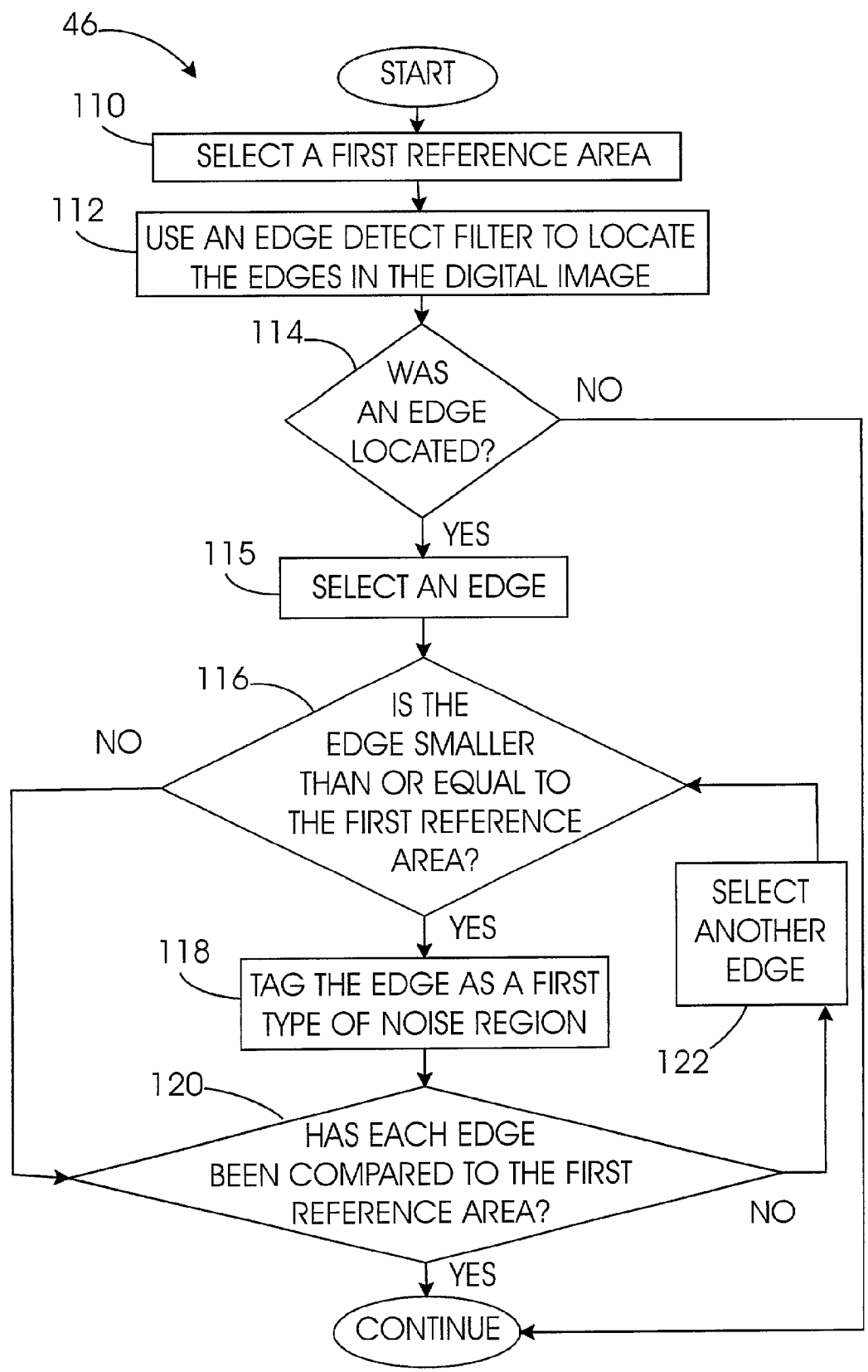
FIG. 7 is a flow chart illustrating an embodiment of the speckle-locating step of the method shown in FIGS. 3A and 3B.

As shown in FIG. 7, a first reference area (not shown) may be selected at step 110. Computer readable program code may be provided that sets the first reference area without any user intervention. For example, the first reference area may be hard coded into the computer readable program code. Such computer readable program code may be stored on one or more computer readable storage media contained within one or more computer readable storage devices (e.g., in FIG. 12, storage device 100, memory 105, etc.) operatively associated with the apparatus 10. Alternatively, other methods of selecting the first reference area are possible. For example, computer readable program code could be provided that allows the user 26 to select the first reference area, for example, by entering a numerical value for the first reference area with an input device (e.g., in FIG. 5, keyboard 42, mouse 44, etc.).

Referring back to FIG. 7, once the first reference area is set, the digital image 14 may be analyzed at step 112 to locate the edges (i.e., the boundaries or contours at which a significant change occurs in some physical aspect, such as intensity, color, and texture, of the digital image 14). To locate the edges (e.g., in FIG. 4, first noise region 15, second noise region 17, border between Statue of Liberty and background) in the digital image 14, an edge detect filter (not shown) may be used. However, since edge detect filters themselves are well known in the art and the details of edge detect filters themselves are not necessary to understand the present invention, the particular edge detect filter used in one embodiment of the present invention will not be described in further detail herein.

At step 114, a determination may be made as to whether an edge was located at step 112. If it is determined that no edges were located at step 112, the speckle-locating method 46 concludes, as will the method 12, since locating a noise speckle is contingent upon first locating an edge in the digital image 14. However, if it is determined at step 114 that one or more edges were found at step 112, one of those edges may be selected at step 115.

In the next step 116, a determination may be made as to whether the selected edge is smaller than or equal to the first reference area. If it is determined at step 116 that the selected edge is smaller than or equal to the first reference area, then that edge may be tagged or labeled as a noise speckle or first type of noise region at step 118.

At step 120, another determination may be made as to whether each of the one or more edges that were located at step 112 has been compared to the first reference area. Step 120 ensures that every edge located at step 112 is analyzed. If it is determined that every edge has been compared with the first reference area, the speckle-locating method 46 concludes. However, if it is determined that each edge has not been compared to the first reference area, then one of the remaining edges may be selected at step 122. The sequence of steps 116 through 120 may then be repeated for the newly selected edge. The number of times that the sequence of steps 116 through 120 is repeated will depend on the number of edges located by the edge detect filter at step 112 in the digital image being filtered.

In the embodiment shown and described herein, the first reference area was set at one pixel. Consequently, only the first noise region 15 (FIG. 4) will be tagged as a first type of noise region at step 118. Since the second noise region 17 and the edge between the Statue of Liberty and the background are both larger than one pixel, neither will be tagged as a first type of noise region at step 118. Alternatively, other values may be selected for the first reference area as would be obvious to one having ordinary skill in the art after having become familiar with the teachings of the present invention.

Referring back to FIG. 3A, in the next step 47 of method 12, a determination may be made as to whether a noise speckle or first type of noise region was located in the digital image 14. If it is determined that no noise speckles were located in the digital image 14, the method 12 concludes. However, if it is determined at step 47 that one or more noise speckles were located at step 46, then at step 49 the image data for each noise speckle may be analyzed, and the unique image data sets thereof may be stored, for example, on a computer readable storage device (e.g., in FIG. 12, storage device 100, memory 105, etc.) operatively associated with the apparatus 10. By only storing image data sets that contain unique data at step 49, the time needed to locate noise splotches in the digital image 14 should be reduced. That is, the method 12 may avoid needlessly cycling through non-unique image data sets at step 75. In the embodiment shown and described herein, the image data for the first noise region 15 will be stored at step 49.

Before proceeding with the description, it should be noted that the image data for the digital image 14, including that of the first and second noise region 15 and 17, may comprise gray scale values. Briefly, the gray scale is a series of shades ranging from black through white that may be used in computer graphics to add detail to images or to represent a color image on a monochrome output device.

Alternatively, the digital image 14 and the first and second noise regions 15, 17 may comprise color image data, such as red, green, and blue tristimulus values. Briefly, color digital images may comprise data representative of the red, green, and blue color components of the object. The particular color components, e.g., red, green, and blue, are commonly referred to as primary colors, primary stimuli, or simply, primaries. As is well known, various combinations of three such primary colors can be used to produce any color stimulus contained within the gamut of colors on the CIE chromaticity diagram that lie within a triangle defined by the primaries. The amounts of each primary color required to match a particular color stimulus are referred to herein as tristimulus values. Written mathematically:

$$C=r(R)+g(G)+b(B)$$

Put in other words, a given color stimulus C (e.g., the color of a given pixel) can be matched by r units of primary stimulus R (red), g units of primary stimulus G (green), and b units of primary stimulus B (blue). All the different physical stimuli that look the same as the given color stimulus C will have the same three tristimulus values r, g, and b. Thus, it is possible to match a color stimulus by a mixture of three primary colors or stimuli, with the tristimulus values r, g, and b determining the required amount of each primary color. It should be noted, however, that the foregoing only achieves a psychophysical color match (i.e., the color will appear the same to the human eye), as opposed to a physical or spectral match.

It should also be noted that the image data for the digital image being filtered, including the image data for the first and second types of noise regions, may also comprise any of wide range of other types of image data as would be obvious to persons having ordinary skill in the art. For example, the image data for the digital image 14 and noise regions 15 and 17 may include color image data relating to various color models including, but not limited to, CMY (cyan, magenta, and yellow), CMYK (cyan, magenta, yellow, and black), CIE (Commission Internationale Eclairage), HSB (hue, saturation, and brightness), YIQ, etc.

Continuing now with the description of method 12, in the embodiment shown and described herein, the first noise region 15 is one pixel. Alternatively, the digital image being filtered may contain one or more noise speckles that comprise a plurality of pixels (not shown), each or some of which may have different or unique image data (e.g., varying colors and shades) associated therewith. If so, the apparatus 10 may perform one of the averaging process 124, 224, or 324 shown in FIGS. 8, 9, and 10, respectively, to obtain average image data for the plurality of pixels comprising a noise speckle or first noise region. The image data averaging processes 124, 224, 324 will be explained in much greater detail below in relation to the region 79.

Now that the first noise region's 15 image data has been stored at step 49, the first noise region 15 may be filtered from (i.e., removed from or smoothed out of) the digital image 14 at step 50. Any of a wide range of filtering processes that are well known in the art may be used at step 50 to filter the first noise region 15 from the digital image 14. In one embodiment, out-range pixel smoothing may be used to smooth the noise speckles (i.e., first noise region 15) from the digital image 14. However, it should be noted that the present invention should not be regarded as limited to any particular noise speckle filtering process. Moreover, since noise speckle filtering processes, including out-range pixel smoothing, are well known in the art and the details of noise speckle filtering processes are not necessary to understand the present invention, the particular noise speckle filtering process utilized in one preferred embodiment of the present invention will not be described in further detail herein.

Referring now to FIG. 3B, regardless of the process used to locate and filter the noise speckles from the digital image in steps 46 through 50, the image data set stored at step 49 may be used at step 75 to locate the second type of noise regions or noise splotches in the digital image 14. In one embodiment, the splotch-locating step 75 may generally comprise the steps illustrated in FIG. 11.

Figure 11:
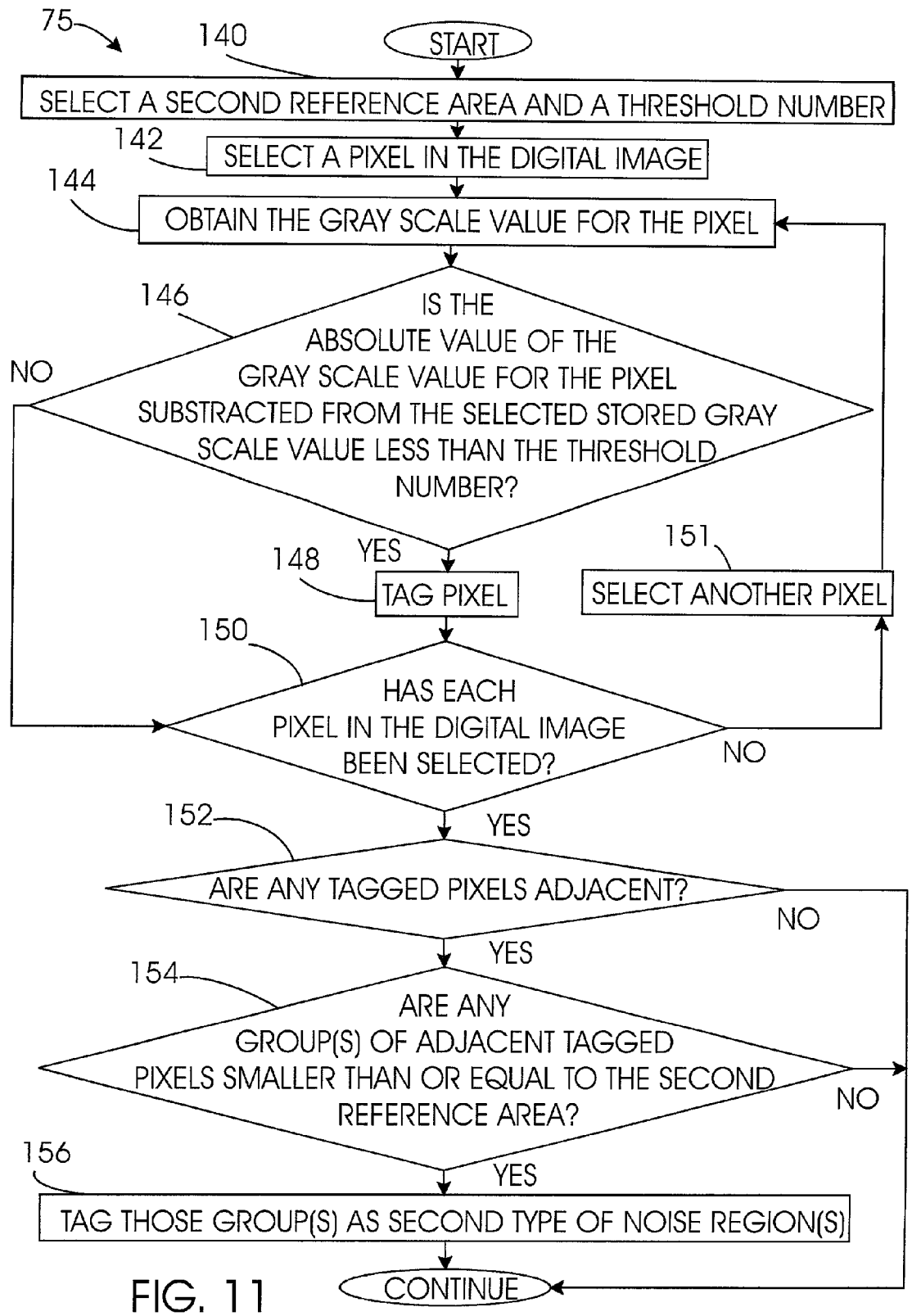
FIG. 11 is a flow chart illustrating an embodiment of the splotch-locating step of the method shown in FIGS. 3A and 3B.

As shown in FIG. 11, a second reference area and a threshold number may be set or selected at step 140. Computer readable program code may be provided that automatically sets the second reference area and the threshold number without any user intervention. For example, the second reference area and threshold number may be hard coded into the computer readable program code. The computer readable program code may be stored on one or more computer readable storage media contained within one or more computer readable storage devices (e.g., in FIG. 12, storage device 100, memory 105, etc.) operatively associated with the apparatus 10. Alternatively, other methods of selecting the second reference area and threshold number are possible. For example, computer readable program code may be provided that allows the user 26 to select the values for the second reference area and the threshold number by entering numerical values with an input device (e.g., in FIG. 5, keyboard 42, mouse 44, etc.).

Regardless of how they are selected, the selection of the second reference area and the threshold number may depend in part on how detailed the digital image 14 being filtered is. For instance, if the digital image 14 is very detailed then the second reference area should be sized (i.e., small enough) such that the details contained in the digital image 14 are not mistakenly identified as noise splotches and later removed from the digital image 14 at step 96 of method 12. Indeed, since it may be difficult to determine the most suitable parameters for the second reference area and threshold numbers in advance, the digital image 14 may be processed using several different second reference areas and threshold numbers until the best results are obtained.

The selection of the second reference area may also depend in part on the first reference area selected at step 110 of speckle-locating method 46. More specifically, in the embodiment shown and described herein, the method 12 may remove all noise regions (i.e., first noise region 15) in the digital image 14 that are smaller than or equal to the first reference area. Consequently, it is generally preferable to have the second reference area be set larger than the first reference area so that the splotch-locating method 75 locates the noise regions (i.e., second noise region 17) in the digital image 14 that are less than or equal to the second reference area and also larger than the first reference area. If the second reference area was less than or equal to the first reference area, the splotch-locating method 75 would not be needed since the noise regions that the splotch-locating method 75 could locate should have already been removed from the digital image 14 by steps 46 through 50 of method 12. By way of example only, in the embodiment shown and described herein, the first reference area may be set at one pixel and the second reference area may be set at four pixels.

In the next step 142 shown in FIG. 11, a pixel may be selected in the digital image 14. In one embodiment, the pixel in the upper left-hand corner of the digital image 14 will be selected at step 142. Alternatively, any of the other pixels comprising the digital image 14 may be selected at step 142.

After a pixel is selected at step 142, the image data (e.g., gray scale value, tristimulus values, etc.) for that pixel may be obtained at step 144. In the embodiment shown and described herein, the image data for the pixel selected at step 142 comprises a gray scale value that is obtained at step 144.

Next, a determination may be made at step 146 as to whether the absolute value of the pixel's gray scale value subtracted from the gray scale value of the first noise region 15 (and other unique gray scale values stored at step 49, as the case may be) is less than the threshold number. If it is determined that the absolute value of the pixel's gray scale value subtracted from the gray scale value for the first noise region 15 is less than the threshold number, then that pixel may be tagged at step 148. Written mathematically, a pixel would be tagged at step 148 if its:

|gray scale value−stored gray scale value|<threshold number

It should be noted that the method 75 illustrated in FIG. 11 assumed that the image data for the pixels of the digital image 14 comprised gray scale values. Alternatively, and as explained earlier, the pixels of the digital image 14 may comprise color image data, such as red, green, and blue tristimulus values. In such an embodiment, three threshold numbers (i.e., a red threshold number, a green threshold number, and a blue threshold number) may be selected at step 140 of splotch-locating method 75. The three threshold numbers may each comprise a value that is different from the other two, although such need not be the case. In addition, step 146 may comprise determining whether the absolute value of the pixel's red tristimulus value subtracted from the stored red tristimulus value for the first noise region 15 (stored at step 49 of method 12) is less than the red threshold number, whether the absolute value of the pixel's green tristimulus value subtracted from the stored green tristimulus value for the first noise region 15 is less than the green threshold number, and whether the absolute value of the pixel's blue tristimulus value subtracted from the stored blue tristimulus value for the first noise region 15 is less than the blue threshold number. Written mathematically, a pixel would be tagged at step 148 if its:

|red tristimulus value−stored red tristimulus value|<red threshold number

|green tristimulus value−stored green tristimulus value|<green threshold number

|blue tristimulus value−stored blue tristimulus value|<blue threshold number

At step 150, another determination may be made as to whether each pixel contained within the digital image 14 has been selected. Step 150 ensures that the gray scale value of each pixel in the digital image 14 is compared at step 146 with the gray scale value stored at step 49 of method 12.

If it is determined at step 150 that all of the pixels comprising digital image 14 have not been selected, another pixel may be selected at step 151. The sequence of steps 144 through 150 may then be repeated for the newly selected pixel. The number of times that the sequence of steps 144 through 150 is repeated will depend on the number of pixels in the digital image 14. The pixels in the digital image 14 may be selected in an order from left-to-right and top-to-bottom. Alternatively, other methods of selecting the pixels in the digital image 14 are possible as would be obvious to one having ordinary skill in the art after having become familiar with the teaching of the present invention.

Once it is determined at step 150 that all of the pixels in the digital image 14 have been selected and analyzed, a determination may then be made at step 152 as to whether any of the pixels that were tagged at step 148 are adjacent. If it is determined that no adjacent pixels were tagged, the splotch-locating method 75 concludes. However, if it is determined that adjacent pixels were tagged at step 148, then each group of adjacent pixels (e.g., second noise region 17) may be compared with the second reference area at step 154. That is, a determination may be made for each group of adjacent tagged pixels at step 154 as to whether that respective group is smaller than or equal to the second reference area. If it is determined that a pixel group is smaller than or equal to the second reference area, that pixel group may be tagged at step 156 as a noise splotch or second type of noise region.

In the embodiment shown and described herein, the digital image 14 includes only a single noise splotch (i.e., second noise region 17). Consequently, only the second noise region 17 will be tagged as a second type of noise region at step 156. Alternatively, the digital image 14 may include a plurality of noise splotches (not shown), each of which may be tagged at step 156 as a second type of noise region or noise splotch.

Referring back to FIG. 3B, a determination may be made at step 76 as to whether a noise splotch was located at step 75. If it is determined at step 76 that one or more noise splotches were located, then one of the one or more noise splotches located at step 75 may be selected at step 77. In the embodiment shown and described herein, the second noise region 17 is selected at step 77 since that is the only noise splotch contained in the digital image 14.

After being selected, the second noise region 17 may be filtered from (i.e., removed from or smoothed out of) the digital image 14. To filter the second noise region 17, the region 79 in the digital image 14 may be selected at step 78.

The apparatus 10 may select the region 79 without any user intervention. That is, computer readable program code may be provided that designates at least one pixel (e.g., 66, 80, 81, 82, 83, 84, 85, 86, 87, 88, 89, 90, 91, 92, etc., see 45' in FIG. 6) adjacent the second noise area 17 as the region 79. In the embodiment shown and described herein, the region 79 comprises the pixels 66, 80, 81, 82, 83, 84, 85, 86, 87, 88, 89, 90, 91, and 92. Alternatively, the region 79 may comprise only those pixels abutting the second noise region 17 and that are located horizontally or vertically from the second noise region 17. That is, the region 79 may comprise pixels 81, 83, 84, 85, 86, 88, 89, and 91. Still yet other pixels and/or other pixel combinations may be used for the region 79 as would be obvious to persons having ordinary skill in the art after having become familiar with the teachings of the present invention.

Other methods of selecting the region 79 are also possible. For example, computer readable program code may be provided that allows the user to select the region 79. The computer readable program code may be stored on a computer readable storage device (e.g., storage device 100, memory 105, etc., FIG. 12) operatively associated with the apparatus 10. In one embodiment, the monitor 34 may display the second noise region 17 and the individual pixels (e.g., 66, 80, 81, 82, 83, 84, 85, 86, 87, 88, 89, 90, 91, 92, etc.) adjacent the second noise region 17 and then prompt the user 26 to select the region 79. The user 26 may be able select the region 79 by marking one or more of the displayed pixels, for example, with an appropriate input device (e.g., keyboard 42, mouse 44. etc.). When selecting the region 79, the user 26 may be required to select a certain number of pixels, a number of pixels falling within a prescribed range, or any number of pixels that the user 26 so desires.

Regardless of how the region 79 is selected, the image data for the region 79 may be obtained at step 94. Since the region 79 may comprise a plurality of pixels, each or some of which may have unique or different image data (e.g., varying colors and shades) associated therewith, the apparatus 10 may perform one of the averaging processes 124, 224, or 324 shown in FIGS. 8, 9, and 10, respectively, at step 95 to compute average image data for the region 79. For example, as shown in FIG. 8, if the image data for the plurality of pixels forming the region 79 comprises gray scale values, computer readable program code may be provided that computes an average gray scale value for the plurality of pixels comprising the region 79. In other words, the respective gray scale values for each of the pixels within the region 79 are first added together at step 126 with the resulting total being divided by the total number of pixels within the region 79 at step 128. However, and as shown in FIG. 9, if the image data for the plurality of pixels forming the region 79 comprises red, green, and blue tristimulus values, then computer readable program code may be provided that computes an average red, average green, and average blue tristimulus value for the plurality of pixels comprising the region 79. That is, the respective red, green, and blue tristimulus values for each of the pixels within the region 79 are first added together at step 226 with the resulting three totals (i.e., red total, green total, blue total) being divided by the total number of pixels within the region 79 at step 228. In an alternative embodiment 324 (FIG. 10), the computer readable program code may first input the respective tristimulus values for each pixel within the region 79 into a color look-up table (not shown) at step 326 to obtain reference numbers associated with the colors corresponding to the inputted tristimulus values. The computer readable program code may next add the reference numbers to obtain a total reference number (step 328) and then divide that total reference number by the number of pixels within the region 79 (step 330) to obtain an average reference number. Finally, the average reference number may be inputted back into the color look-up table at step 332 to obtain the corresponding red, green, and blue tristimulus values associated with the average reference number.

The color look-up table which may be used in the image data averaging process 324 may comprise a three dimensional matrix of data in which corresponding colors in a defined color space (e.g., Pantone Matching System, etc.) are assigned to the various combinations of tristimulus values. In other words, a corresponding color may assigned to a specific location having the coordinates r, g, b in the color look-up table where r, g, b represent the respective tristimulus values for the corresponding color. The color look-up table may be stored on a computer readable storage device (e.g., in FIG. 12, storage device 100, memory 105, etc.). Alternatively, other storage locations, sizes and configurations are possible for the color look-up table.

Rather than having the apparatus 10 use each and every pixel of the plurality of pixels forming the region 79 when averaging the image data for the region 79, computer readable program code may be provided that randomly selects one or more of the pixels within the region 79. In another alternative embodiment, the individual pixels forming the region 79 may be displayed on the monitor 34, and the user 26 may be able to select one or more of the displayed pixels, for example, by marking the pixel(s) with an appropriate input device (e.g., in FIG. 5, keyboard 42, mouse 44, etc.). Once marked, only that portion of the image data signal representative of the selected pixel(s) would be used in the image data averaging process 124, 224, or 324. It should be noted that if the user 26 marks only one pixel, the averaging processes 124, 224, or 324 would not be needed.

In yet another alternative embodiment, the user 26 may be prompted to select between the various colors of the pixels comprising the region 79. For example, the various colors of the region 79 may be displayed on the monitor 34, and the user 26 may be able to select one by marking the desired color with an appropriate input device (e.g., keyboard 42, mouse 44, etc.). Once marked, only that portion of the image data signal representative of the selected color would be used in the mapping step 96 of method 12. In still yet another alternative embodiment, computer readable program code could be provided that first determines which color contained within the region 79 dominates and then selects that dominant color. Once selected, only that portion of the image data signal representative of the dominant color would be used in the mapping step 96 of method 12. To determine the dominant color within the region 79, computer readable program code may be provided that analyzes the region 79 and then selects the color (i.e., the dominant color) that appears most often therein. While conducting the dominant color analysis, a histogram may be created. For example, if the image data for region 79 comprises gray scale values, a histogram may be created that includes horizontal or vertical bars, each having a length in proportion to the frequency in which the gray scale value it represents appears in the region 79. However, if the image data for the region 79 comprises tristimulus values, a histogram may be created for each of the respective sets of tristimulus values (red, green and blue). The three histograms may include horizontal or vertical bars, each having a length in proportion to the frequency in which the tristimulus value it represents appears in the region 79. Since histograms themselves are well known in the art and could be easily provided by persons having ordinary skill in the art after having become familiar with the teachings of the present invention, the particular histogram(s) utilized in one preferred embodiment of the invention will not be described in detail herein.

At step 96 of method 12 (FIG. 3B), the average image data for the region 79 may be mapped to the second noise region 17 so that the second noise region 17 is removed from or smoothed out of the digital image 14. See 45' and 45" in FIG. 6. That is, the image data for the second noise region 17 may be replaced with the average image data for the region 79.

In the next step 97, a determination may be made as to whether each noise splotch or second type of noise region located at step 75 has been filtered from the digital image 14. If it is determined that each noise splotch has been filtered from the digital image 14, the method 12 concludes. However, if it is determined that each noise splotch has not been filtered from the digital image 14, one of the remaining noise splotches may then be selected at step 98. The series of steps 78 through 97 may then be repeated for the newly selected noise splotch. The number of times that the sequence of steps 78 through 97 is repeated will depend on the number of noise splotches located at step 75. In the embodiment shown and described herein, however, the sequence of steps 78 through 97 will not be repeated as the digital image 14 contains only one noise splotch (i.e., second noise region 17). In an alternative embodiment, rather than having to repeat the series of steps 78 through 97 when the digital image being filtered contains more than one noise splotch, each of the steps 78 through 96 may instead be performed for each noise splotch before the next step is undertaken. For example, step 78 may comprise selecting a region for each of the one or more noise splotches located at step 75. Step 94 may comprise obtaining image data for each of the regions selected at step 78. Step 95 may comprise computing average image data for each region from its image data. Finally, step 96 may comprise mapping the average image data for each region to the corresponding second type of noise region.

It should be noted that the present invention also contemplates methods in which more than two passes are used during the filtering of noise speckles and noise splotches from a digital image. That is, although it is generally preferable to locate and filter the noise speckles in a first pass through a digital image and to then locate and filter the noise splotches in a second pass through the digital image, such is not required.

Moreover, the present invention also contemplates methods including more steps than what are shown in FIGS. 3A, 3B, 7, and 11. As briefly mentioned earlier, the method 12 may provide for an automated process, a user interactive process, or a combination thereof. The extent that the user 26 may be required or allowed to participate in the filtering process may vary greatly. For example, the user 26 may be prompted for each noise splotch (e.g., second noise region 17) to select between filtering and not filtering the respective noise splotch. In one embodiment, the method 12 may comprise the additional steps (not shown) of displaying the second noise region 17 on the monitor 34 and then prompting the user 26 to choose whether the second noise region 17 will be filtered from the digital image 14. Depending on the user's 26 response, the second noise region 17 may then be filtered from the digital image 14 in the manner previously described. In another embodiment, the method 46 (FIG. 7) may further comprise the steps (not shown) of displaying on the monitor 34 an edge that has been determined to be smaller than or equal to the first reference area, and then prompting the user 26 to select between tagging the displayed edge as a first type of noise region and disregarding the displayed edge (i.e., not tagging the displayed edge as a first type of noise region). In yet another embodiment, the method 75 (FIG. 11) may comprise the additional steps (not shown) of displaying on the monitor 34 a group of adjacent tagged pixels for which it has been determined is smaller than or equal to the second reference area, and then prompting the user 26 to select between tagging the group as a second type of noise region and disregarding the pixel group (i.e., not tagging the pixel group as a second type of noise region).

Moreover, the method 12 may further comprise the steps of creating a first destination or temporary file and writing to the first destination file the image data for the digital image without the noise speckles (i.e., with the noise speckles filtered from the digital image). Similarly, the method 12 may further comprise creating a second destination or temporary file and writing to the second destination file the image data of the digital image without either the noise speckles or the noise splotches (i.e., with both the noise speckles and noise splotches filtered from the digital image). By providing these additional steps, a source or original copy of the digital image may be maintained or preserved. That is, the image data for the digital image with the noise speckles and noise splotches therein may be maintained or preserved. Any of a wide range of file formats (e.g., jpeg file format (".jpg"), a bitmap file format (".bmp"), portable document format (".pdf"), tagged image file format (".tiff"), etc.) may be used when writing the image data to the first and/or second destination files as would be obvious to persons having ordinary skill in the art after having become familiar with the teachings of the present invention.

Depending on the numerical value assigned to the second reference area, a noise splotch located in a digital image may be relatively large. If so, the relatively large noise splotch may be subdivided into a plurality of subsections. Next, a region in the digital image may then be selected for each of the plurality of subsections. Then, image data for each of the regions may be obtained and average image data for each of the regions may be computed therefrom. Finally, the average image data for each of the regions may be mapped to the corresponding one of the plurality of subsections so that each of the plurality of subsections comprising the relatively large noise splotch may be removed from or smoothed out of the digital image.

It is to be understood that the computer readable program code described herein can be conventionally programmed using any of a wide range of suitable computer readable programming languages that are now known in the art or that may be developed in the future. It is also to be understood that the computer readable program code can include one or more functions, routines, subfunctions, and subroutines, and need not be combined in a single package but may instead be embodied in separate components. Moreover, it is believed that a disclosure of the computer readable program code is not necessary, as one skilled in the programming arts should be able to generate such code without undue experimentation given the disclosure of the invention found herein. Accordingly, the details associated with the programming of the computer readable program code itself will not be discussed in further detail herein.

It is contemplated that the inventive concepts herein described may be variously otherwise embodied and it is intended that the appended claims be construed to include alternative embodiments of the invention except insofar as limited by the prior art.

What is claimed is:

1. A method, comprising:
    obtaining image data for a first type of noise region in a digital image;
    using said image data for said first type of noise region to locate a second type of noise region in said digital image; and
    filtering said second type of noise region.

2. The method of claim 1, wherein said digital image comprises color image data; wherein said first type of noise region comprises color image data; and wherein said second type of noise region comprises color image data.

3. The method of claim 1, further comprising locating said first type of noise region in said digital image.

4. The method of claim 3, wherein locating said first type of noise region in said digital image comprises:
    using an edge detect filter to locate an edge in said digital image;
    determining whether said edge is less than or equal to a first reference area; and
    if said edge is determined to be less than or equal to said first reference area, tagging said edge as a first type of noise region.

5. The method of claim 3, wherein locating said first type of noise region in said digital image comprises using out-range pixel smoothing to locate said first type of noise region.

6. The method of claim 1, further comprising allowing a user to decide whether said second type of noise region is filtered.

7. The method of claim 1, wherein using said image data for said first type of noise region to locate a second type of noise region in said digital image comprises:
    locating in said digital image a group of adjacent pixels, each pixel of said group of adjacent pixels having image data substantially similar to the image data for said first type of noise region; and
    determining whether said group of adjacent pixels is less than or equal to a second reference area.

8. The method of claim 7, further comprising allowing a user to select said second reference area.

9. The method of claim 7, wherein the image data for said first type of noise region comprises a gray scale value; wherein the image data for each pixel of said group of adjacent pixels comprises a gray scale value; and wherein the image data for a corresponding pixel of said group of adjacent pixels is substantially similar to the image data for said first type of noise region when the absolute value of the gray scale value of said corresponding pixel subtracted from the gray scale value of said first type of noise region is less than a threshold number.

10. The method of claim 9, further comprising allowing a user to select said threshold number.

11. The method of claim 7, wherein the image data for said first type of noise region comprises color image data; and wherein the image data for each pixel of said group of adjacent pixels comprises color image data.

12. The method of claim 11, wherein the color image data of said first type of noise region comprises:
    a red tristimulus value;
    a green tristimulus value; and
    a blue tristimulus value;
wherein the color image data for each of said group of adjacent pixels comprises:

a red tristimulus value;
a green tristimulus value; and
a blue tristimulus value;
wherein the image data for a corresponding pixel of said group of adjacent pixels is substantially similar to the image data for said first type of noise region when the absolute value of the red tristimulus value of said corresponding pixel subtracted from the red tristimulus value of said first type of noise region is less than a red threshold number, when the absolute value of the green tristimulus value of said corresponding pixel subtracted from the green tristimulus value of said first type of noise region is less than a green threshold number, and when the absolute value of the blue tristimulus value of said corresponding pixel subtracted from the blue tristimulus value of said first type of noise region is less than a blue threshold number.

13. The method of claim 12, further comprising allowing a user to select said red, green, and blue threshold numbers.

14. The method of claim 1, wherein filtering said second type of noise region from said digital image comprises:
obtaining image data for a region in said digital image;
computing average image data from the image data for said region; and
mapping said average image data to said second type of noise region.

15. The method of claim 14, wherein said region comprises at least one pixel located adjacent said second type of noise region.

16. The method of claim 14, further comprising allowing a user to select said region.

17. The method of claim 14, wherein said region comprises one or more pixels, each of said one or more pixels having image data comprising a gray scale value; and wherein computing average image data from the image data for said region comprises computing an average gray scale value from the gray scale value of at least one pixel of said one or more pixels.

18. The method of claim 14, wherein said region comprises one or more pixels, each of said one or more pixels having color image data comprising:
a red tristimulus value;
a green tristimulus value; and
a blue tristimulus value;
wherein computing average image data from the image data for said region comprises computing an average red tristimulus value, and average green tristimulus value, and an average blue tristimulus value from the red, green, and blue tristimulus values of at least one pixel of said one or more pixels.

19. The method of claim 14, wherein said region comprises one or more pixels, each of said one or more pixels having color image data comprising:
a red tristimulus value;
a green tristimulus value; and
a blue tristimulus value;
wherein computing average image data from the image data for said region comprises:
inputting the red, green and blue tristimulus values of at least one pixel of said one or more pixels into a color lookup table to obtain one or more color reference numbers;
computing an average color reference number from said one or more color reference numbers; and
inputting the average color reference number into said color look-up table to obtain a red tristimulus value, a green tristimulus value, and a blue tristimulus value.

20. The method of claim 1, wherein filtering said second type of noise region comprises:
subdividing said second type of noise region into a plurality of subsections;
obtaining image data for a region associated with each of said plurality of subsections;
computing average image data for each of said regions from its image data; and
mapping said average image data for each of said regions to a corresponding one of said plurality of subsections.

21. Apparatus, comprising:
one or more computer readable storage media;
computer readable program code stored on said one or more computer readable storage media, comprising:
program code for obtaining image data for a first type of noise region in a digital image;
program code for using said image data for said first type of noise region to locate a second type of noise region in said digital image; and
program code for filtering said second type of noise region.

22. Apparatus, comprising:
means for obtaining image data for a first type of noise region in a digital image;
means for using said image data for said first type of noise region to locate a second type of noise region in said digital image; and
means for filtering said second type of noise region.

* * * * *

UNITED STATES PATENT AND TRADEMARK OFFICE
CERTIFICATE OF CORRECTION

| | | |
|---|---|---|
| PATENT NO. | : 7,031,548 B2 | Page 1 of 1 |
| APPLICATION NO. | : 09/971719 | |
| DATED | : April 18, 2006 | |
| INVENTOR(S) | : Scott Clinton Baggs | |

It is certified that error appears in the above-identified patent and that said Letters Patent is hereby corrected as shown below:

In column 18, line 25, in Claim 4, delete "a" and insert -- said --, therefor.

In column 20, line 11, in Claim 19, delete "lookup" and insert -- look-up --, therefor.

Signed and Sealed this

Fourteenth Day of February, 2012

David J. Kappos
*Director of the United States Patent and Trademark Office*